(12) United States Patent
Derham et al.

(10) Patent No.: US 10,532,808 B2
(45) Date of Patent: Jan. 14, 2020

(54) APPARATUS FOR USING AIRCRAFT ACTIVE VIBRATION CONTROL SYSTEM AS PILOT CUEING AID

(71) Applicant: The Boeing Company, Chicago, IL (US)

(72) Inventors: Robert C. Derham, Mullica Hill, NJ (US); Gregory R. Turk, Media, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/231,425

(22) Filed: Dec. 22, 2018

(65) Prior Publication Data

US 2019/0127055 A1 May 2, 2019

Related U.S. Application Data

(62) Division of application No. 15/457,605, filed on Mar. 13, 2017, now Pat. No. 10,160,537.

(51) Int. Cl.
| | | |
|---|---|---|
| G08B 21/00 | (2006.01) | |
| B64C 27/00 | (2006.01) | |
| G05D 1/00 | (2006.01) | |
| G01P 13/02 | (2006.01) | |
| B64D 43/02 | (2006.01) | |
| B64D 45/00 | (2006.01) | |
| G01P 3/48 | (2006.01) | |
| G01P 15/00 | (2006.01) | |

(52) U.S. Cl.
CPC ............ *B64C 27/001* (2013.01); *B64D 43/02* (2013.01); *G01P 13/025* (2013.01); *G05D 1/0066* (2013.01); *B64C 2027/004* (2013.01); *B64D 45/00* (2013.01); *G01P 3/48* (2013.01); *G01P 15/00* (2013.01)

(58) Field of Classification Search
CPC ..... B64C 27/001; B64C 43/02; G01B 13/025; G05D 1/0066
USPC ................ 340/945, 950, 961, 963, 973, 980
See application file for complete search history.

(56) References Cited

U.S. PATENT DOCUMENTS

| | | |
|---|---|---|
| 4,115,755 A | 9/1978 | Cotton |
| 5,903,077 A | 5/1999 | Gamjost et al. |
| 7,900,873 B2 | 3/2011 | Kulesha et al. |
| 7,958,801 B2 | 6/2011 | Frederickson |
| 8,639,399 B2 | 1/2014 | Jolly et al. |
| 9,073,627 B2 | 7/2015 | Jolly et al. |

(Continued)

FOREIGN PATENT DOCUMENTS

WO  2014092975 A1  6/2014

*Primary Examiner* — Tai T Nguyen
(74) *Attorney, Agent, or Firm* — Ostrager Chong Flaherty & Broitman P.C.

(57) ABSTRACT

Systems and methods for cueing a helicopter pilot when a flight parameter (such as rotor-induced vibration level, airspeed, bank angle, icing accumulation, etc.) exceeds operational constraints. This is accomplished by reformulating the on-board cockpit active vibration control system to add a pilot cueing aid. When the measured flight parameter becomes excessive, the active vibration control system is temporarily detuned, which reduces the amount of vibration suppression it provides or turns off vibration suppression, causing an increase in airframe vibration levels to cue the pilot to take action (e.g., to fly within operating limits).

20 Claims, 4 Drawing Sheets

(56) References Cited

U.S. PATENT DOCUMENTS

| | | |
|---|---|---|
| 2012/0298794 A1 | 11/2012 | Krysinski et al. |
| 2015/0289056 A1* | 10/2015 | Storm .................. B64C 27/001 381/71.4 |
| 2017/0225774 A1 | 8/2017 | Welsh et al. |
| 2017/0297686 A1 | 10/2017 | Hunter et al. |
| 2018/0170532 A1* | 6/2018 | Black .................. B64C 27/001 |

\* cited by examiner

| IVCS Mode: | OFF | Standby ← | ← Active → | → Standby | OFF |
|---|---|---|---|---|---|---|
| Input Freq.: | 0% | 90% | 96% | 100% | 106% | 110% |
| AC Gen (Hz) | 0 | ~360 | ~383 | ~400 | ~424 | ~440 |
| $N_r$ (rpm) | 0 | ~202 | ~214 | ~225 | ~239 | ~248 |

FIG. 3

APPARATUS FOR USING AIRCRAFT ACTIVE VIBRATION CONTROL SYSTEM AS PILOT CUEING AID

RELATED PATENT APPLICATION

This application is a divisional of and claims priority from U.S. patent application Ser. No. 15/457,605 filed on Mar. 13, 2017, which issued as U.S. Pat. No. 10,160,537 on Dec. 25, 2018.

STATEMENT REGARDING FEDERALLY SPONSORED RESEARCH AND DEVELOPMENT

This invention was made with Government support under Contract Nos. W911W6-12-D0006 and W58RGZ-04-G-0023 awarded by the Department of Defense. The Government has certain rights in this invention.

BACKGROUND

This disclosure generally relates to systems and methods for providing feedback to a pilot indicating that a flight parameter has exceeded constraints for proper operation during flight of an aircraft.

It is known to provide visual indicators in a cockpit for providing feedback to a helicopter pilot. However, in some cases the pilot may be distracted while flying the helicopter and may not notice a visual indicator indicating that a flight parameter (such as rotor-induced vibration level, airspeed, bank angle, icing accumulation, etc.) has exceeded constraints for proper operation.

For example, the loads in the rotor system of a helicopter may vary widely as a function of airspeed and aircraft gross weight. (As used herein, the term "rotor system" should be construed broadly to encompass one or more rotors operatively coupled to one or more engines by components configured to drive rotation of the rotor(s).) At certain combinations of airspeeds and loads, airframe vibration can be significant. It is known to measure alternating stress loads at each rotor of a twin-engine, tandem rotor helicopter by means of an electromechanical transducer, which provides an indication (called a cruise guide indicator) of rotor loading on the pilot instrument panel. The cruise guide indicator system gives the pilot a visual indication of actual loads imposed on critical components of the helicopter dynamic system. In a twin-engine, tandem rotor helicopter, the cruise guide indicator system measures forward and aft oscillatory loads transmitted from rotor systems to the airframe. (As used herein, the term "airframe" includes the fuselage and the cockpit structure.) The cruise guide indicator can provide a warning to the pilot to either decrease airspeed or reduce the severity of maneuvers to minimize loads in excess of the endurance limit of the dynamic components. Currently, there is no cueing from the cruise guide indicator to the pilot when exceedances for high loads are encountered beyond the visual display of a red indicator. Partially as a result of this, in practice the flight envelope of the helicopter may be restricted. For example, the gross weight of the helicopter at take-off may be restricted. This affects the full productivity and value of the helicopter to be realized by operators.

It would be desirable to provide improved systems and methods for cueing a helicopter pilot when a measured flight parameter exceeds an operating constraint.

SUMMARY

The subject matter disclosed in detail below is directed to enhanced systems and methods for cueing a helicopter pilot when a flight parameter (such as rotor-induced vibration level, airspeed, bank angle, icing accumulation, etc.) exceeds operational constraints. This is accomplished by reformulating the on-board cockpit active vibration control (i.e., suppression) system to add a pilot cueing aid. When the measured flight parameter becomes excessive, the active vibration control system is temporarily detuned, which reduces the amount of vibration suppression it provides or turns off vibration suppression, causing an increase in airframe vibration levels to cue the pilot to take action (e.g., to fly within operating limits). The system detunes the cockpit active vibration control system based upon an input from the flight control computer, cruise guide indicator, or other input reading that results from an exceedance of the desired flight envelope such that the pilots will feel higher vibrations (e.g., seat or stick vibrations) when the aircraft is operating in a manner that may cause damage to flight critical components. Thus the system proposed herein provides a non-interference and intuitive pilot cueing of excessive operating conditions that can be employed on-board any aircraft that uses an active vibration control system.

Although various embodiments of systems and methods for cueing a helicopter pilot when a measured flight parameter becomes excessive are disclosed in some detail below, one or more of those embodiments may be characterized by one or more of the following aspects.

One aspect of the subject matter disclosed in detail below is a method for cueing a pilot when a measured flight parameter is excessive during flight of a rotorcraft, comprising: generating a power signal having a frequency which is a function of a rotor speed of a rotor system of the rotorcraft; measuring a flight parameter; processing data representing the measured flight parameter to determine whether the measured flight parameter exceeds a specified threshold; generating counter-vibrations in the airframe of the rotorcraft which have the frequency of the power signal while the measured flight parameter is less than the specified threshold; and ceasing the generation of counter-vibrations having the frequency of the power signal in response to the measured flight parameter exceeding the specified threshold. In accordance with one embodiment, the counter-vibrations are generated by a vibration control system in an active state, and ceasing the generation of counter-vibrations comprises changing the state of the vibration control system from the active state to a standby state. In accordance with one proposed implementation, the flight parameter is derived from results of measurement of rotor-induced oscillatory loads.

In accordance with one embodiment, generating the power signal comprises generating a first alternating-current voltage having a first frequency which is proportional to the rotor rpm. In this case, the method further comprises: inputting the first alternating-current voltage to the vibration control system while the measured flight parameter is less than the specified threshold; and not inputting the first alternating-current voltage to the vibration control system while the measured flight parameter is greater than the specified threshold. In one proposed implementation, the method further comprises: converting the first alternating-current voltage into a second alternating-current voltage having a second frequency which is not proportional to the rotor rpm; and inputting the second alternating-current voltage to the vibration control system while the measured flight parameter is greater than the specified threshold. The state of the vibration control system changes from the active state to the standby state in response to inputting of the second alternating-current voltage.

Another aspect of the subject matter disclosed herein is a method for cueing a pilot when a measured flight parameter is excessive during flight of a rotorcraft, comprising: measuring a flight parameter; processing data representing the measured flight parameter to determine whether the measured flight parameter exceeds a specified threshold; generating a first alternating-current voltage having a first frequency which is proportional to a rotor rpm; inputting the first alternating-current voltage to a vibration control system while the measured flight parameter is less than the specified threshold; converting the first alternating-current voltage into a second alternating-current voltage having a second frequency which is not proportional to the rotor rpm when the measured flight parameter becomes greater than the specified threshold; and inputting the second alternating-current voltage, instead of the first alternating-current voltage, to the vibration control system while the measured flight parameter is greater than the specified threshold, wherein the vibration control system situated and configured to generate forces that suppress vibrations in the airframe of the rotorcraft having the first frequency in response to inputting of the first alternating-current voltage and to not generate forces in response to inputting of the second alternating-current voltage. A state of the vibration control system changes from an active state to a standby state in response to inputting of the second alternating-current voltage. In accordance with one proposed implementation, the flight parameter is derived from results of measurement of rotor-induced oscillatory loads.

A further aspect of the subject matter disclosed in detail below is a rotorcraft comprising: an airframe; a rotor system comprising at least one rotor; at least one strain gauge situated and configured to measure oscillatory loads transmitted from the rotor system to the airframe and output signals representing the measured oscillatory loads; a generator configured to output an alternating-current voltage having a first frequency which is a function of a rotor rpm of the rotor system; a signal conditioner configured to output an alternating-current voltage having a second frequency in response to input of the alternating-current voltage having the first frequency and receipt of a command signal and to output the alternating-current voltage having the first frequency in response to input of the alternating-current voltage having the first frequency and non-receipt of the command signal, wherein the second frequency is not a function of the rotor rpm; a vibration control system situated and configured to generate forces that suppress vibrations in the airframe having the first frequency in response to inputting of the first alternating-current voltage and to not generate forces that suppress vibrations in the airframe having the first frequency in response to inputting of the second alternating-current voltage; and a computing system configured to receive the signals representing the measured oscillatory loads and output the command signal in response to receipt of signals indicative of measured oscillatory loads in excess of a specified threshold. The state of the vibration control system changes from the active state to the standby state in response to output of an alternating-current voltage having a second frequency by the signal conditioner. In accordance with one embodiment, the computing system comprises a cruise guide indicator controller that is configured to output an azimuth angle signal and a flight control computer that outputs the command signal in response to receipt of an azimuth angle signal from the cruise guide indicator indicative of measured oscillatory loads in excess of a specified threshold.

Yet another aspect is a pilot cueing system comprising: one or more sensors configured to measure a flight parameter during flight of a rotorcraft and output signals representing the measured flight parameter; a generator configured to output an alternating-current voltage having a first frequency which is a function of a rotor rpm of the rotor system; a signal conditioner configured to output an alternating-current voltage having a second frequency in response to input of the alternating-current voltage having the first frequency and receipt of a command signal and to output the alternating-current voltage having the first frequency in response to input of the alternating-current voltage having the first frequency and non-receipt of the command signal, wherein the second frequency is not a function of the rotor rpm; a vibration control system situated and configured to generate forces that suppress vibrations in the airframe having the first frequency in response to inputting of the first alternating-current voltage and to not generate forces that suppress vibrations in the airframe having the first frequency in response to inputting of the second alternating-current voltage; and a computing system configured to receive the signals representing the measured flight parameter from the one or more sensors and output the command signal in response to receipt of a signal indicative of the measured flight parameter being in excess of a specified threshold. In accordance with a further embodiment, the pilot cueing system further comprises a cockpit display indicator, and the computing system comprises: a first processor or computer that outputs a signal to the cockpit display indicator representing a current value of the measured flight parameter in response to receipt of the signals representing the measured flight parameter from the one or more sensors; and a second processor or computer that outputs the command signal in response to the current value of the measured flight parameter being in excess of a specified threshold. In accordance with one proposed implementation, the one or more sensors are strain gauges, the flight parameter is derived from the results of measurement of rotor-induced oscillatory loads, and the computing system comprises a cruise guide indicator controller that is configured to output an azimuth angle signal and a flight control computer that outputs the command signal in response to receipt of an azimuth angle signal from the cruise guide indicator indicative of measured oscillatory loads in excess of a specified threshold.

Other aspects of systems and methods for cueing a helicopter pilot when a measured flight parameter becomes excessive are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 3 is a chart listing rotor rpms and input frequencies for various operational states of an active vibration control system in accordance with one embodiment.

Reference will hereinafter be made to the drawings in which similar elements in different drawings bear the same reference numerals.

DETAILED DESCRIPTION

Various embodiments of systems and methods for cueing a helicopter pilot when a flight parameter becomes excessive will now be described in detail for the purpose of illustration. As used herein, the term "cue" or "cueing" means a signal, indicator or other change of state that is perceptible to a human pilot. At least some of the details disclosed below relate to optional features or aspects, which in some applications may be omitted without departing from the scope of the claims appended hereto.

In particular, illustrative embodiments of systems for cueing a helicopter pilot when measured oscillatory loads become excessive are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Although embodiments of the pilot cueing system will be described with reference to a twin-engine, tandem rotor helicopter, it should be appreciated that application of the concepts disclosed herein is not limited to twin-engine, tandem rotor helicopter, but rather may be applied to any type of helicopter that incorporates an active vibration control system.

Figure 1:
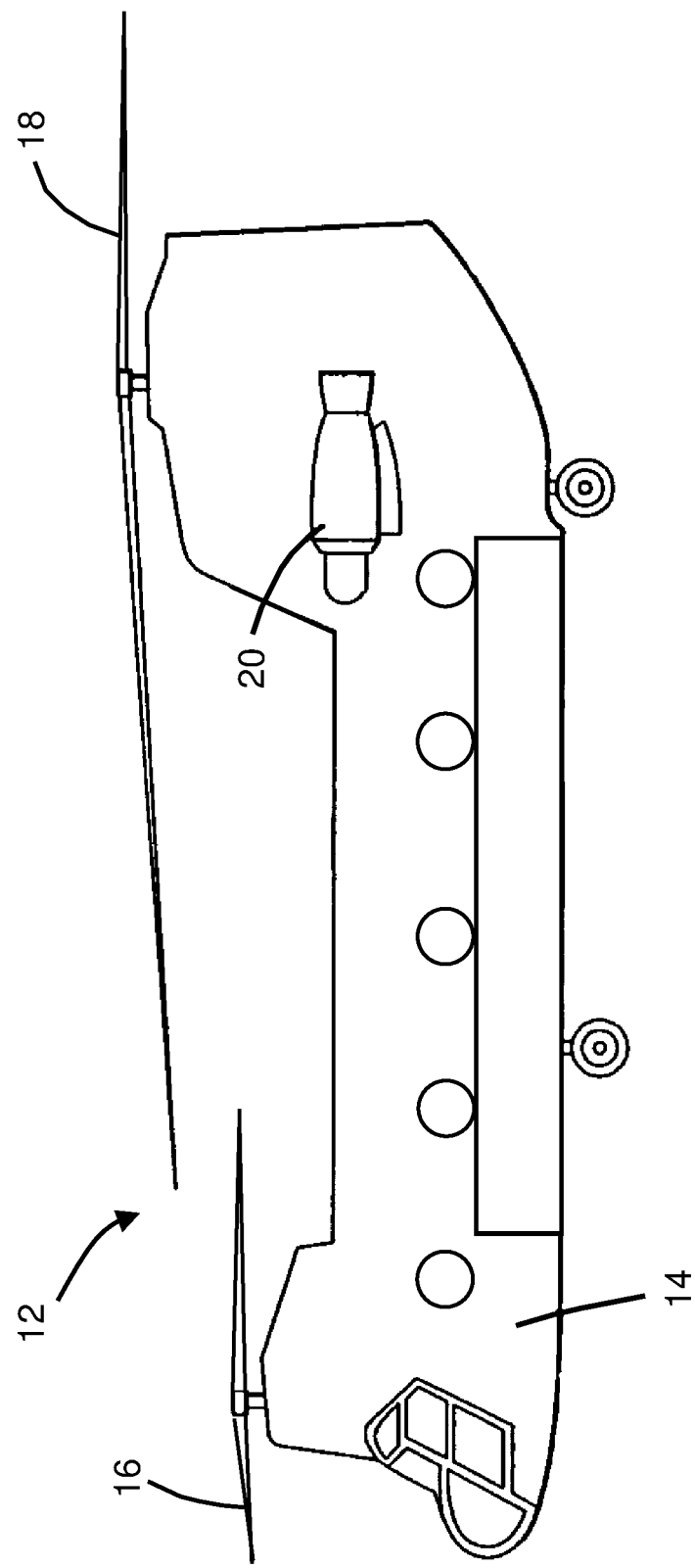
FIG. 1 is a diagram representing a side view of a twin-engine tandem rotor rotorcraft in accordance with one embodiment.

FIG. 1 is a diagram representing a side view of a twin-engine tandem rotor rotorcraft in accordance with one embodiment. As illustrated in FIG. 1, a tandem-rotor helicopter 12 (such as a Boeing CH-47 Chinook) has an airframe 14, a fore main rotor 16 and an aft main rotor 18. The tandem-rotor helicopter 12 is powered by two turboshaft engines 20 (only one of which is visible in FIG. 1), mounted on each side of the helicopter's rear pylon and connected to the rotors by driveshafts. A turboshaft engine is a form of gas turbine which is optimized to produce shaft power rather than jet thrust. The fore main rotor 16 and aft main rotor 18 rotate in opposite directions. The counter-rotating rotors cancel the torque reaction so that no tail rotor or other yaw stabilizer in required, allowing all power to be used for lift and thrust. Tandem rotors achieve aircraft pitch attitude changes through cyclic pitch and/or differential collective pitch. Flight control devices (not shown in FIG. 1) vary the pitch of the rotor blades cyclically throughout rotation. Although in this example, the fore main rotor 16 and aft main rotor 18 each have three blades (only two blades are visible in FIG. 1), the number of blades may be greater than three.

The helicopter rotors operate in an asymmetric turbulent environment that produces oscillations in the flexible rotor blades. The oscillatory loads produced during rotor rotation are, in the absence of any counteracting system, transmitted from the fore main rotor 16 and aft main rotor 18 to the airframe 14, causing the airframe 14 (and components inside the airframe) to vibrate. It is known to reduce vibration in the helicopter airframe generated by the rotors using an active vibration control system, such as the active vibration control system 10 depicted in FIG. 2. Active vibration control systems use the phenomenon of destructive interference between the airframe vibrations and counter-vibrations produced by the active vibration control system.

Figure 2:
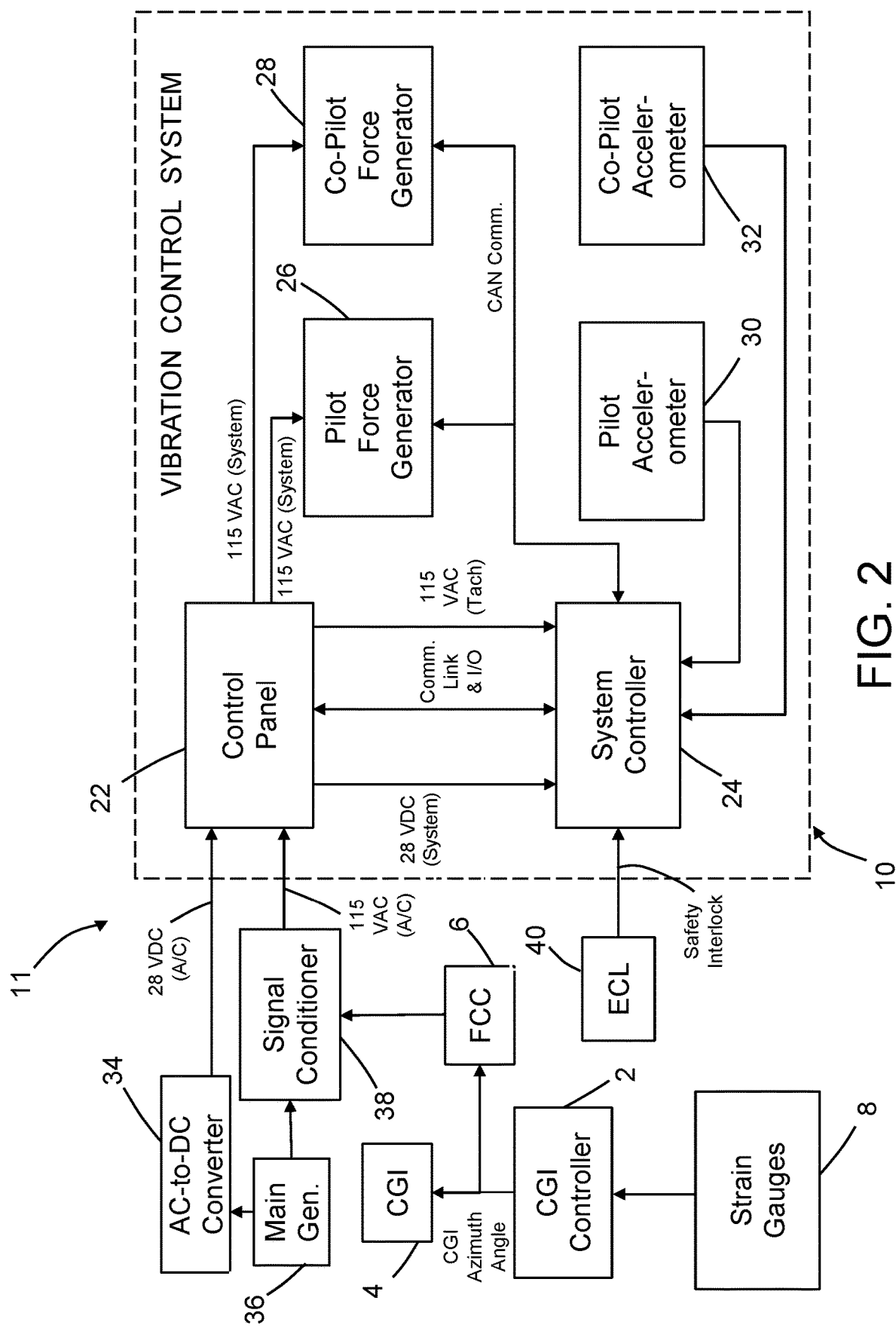
FIG. 2 is a block diagram identifying components of a pilot cueing system in accordance with one embodiment.

FIG. 2 is a block diagram identifying components of a helicopter pilot cueing system 11 in accordance with one embodiment. The helicopter pilot cueing system 11 disclosed herein utilizes the on-board active vibration control system 10 to cue the pilot when rotor-induced oscillatory loads become excessive. More specifically, when the measured rotor-induced oscillatory loads are not excessive, the active vibration control system 10 suppresses the resulting vibrations at specific locations. However, when the measured rotor-induced oscillatory loads become excessive, the active vibration control system 10 is "detuned", meaning that instead of producing counter-vibrations that interfere destructively with the rotor-induced vibrations, the active vibration control system 10 either produces reduced vibrations or changes from an active mode to a standby mode, thereby providing tactile feedback to the pilot when rotor-induced oscillatory loads become excessive.

As will be explained in more detail hereinafter, the pilot cueing system 11 depicted in FIG. 2 comprises at least the following components:

(1) at least one strain gauge (e.g., strain gauges 8) situated and configured to measure accelerations caused by oscillatory loads transmitted from a rotor system (such as the rotor system comprising fore main rotor 16 and aft main rotor 18 depicted in FIG. 1 and other components) to an airframe of the rotorcraft and output signals representing the measured strains;

(2) a generator (e.g., main generator 36) configured to output an alternating-current voltage having a first frequency which is a function of a rotor rpm of the rotor system;

(3) a signal conditioner 38 configured to output an alternating-current voltage having a second frequency in response to input of the alternating-current voltage having the first frequency from the generator and receipt of a command signal (from a computing system), and to output the alternating-current voltage having the first frequency to an active vibration control system 10 in response to input of the alternating-current voltage having the first frequency and non-receipt of the command signal, wherein the second frequency is not a function of the rotor rpm;

(4) active vibration control system 10 situated and configured to generate forces that suppress vibrations in the airframe having the first frequency in response to inputting of the first alternating-current voltage and to not generate forces in response to inputting of the second alternating-current voltage; and (5) a computing system (e.g., CGI controller 2 and flight control computer 6) configured to receive the signals representing the strain gauge readings and output the command signal in response to receipt of signals from the strain gauges indicative of oscillatory loads in excess of a specified threshold.

First, the system for determining whether rotor-induced oscillatory loads have become excessive or not will be described in some detail with reference to FIG. 2. Then the active vibration control system 10 will be described in some detail. Lastly, the system for cueing the pilot when the rotor-induced oscillatory loads become excessive will be described in some detail.

The example pilot cueing system 10 depicted in FIG. 2 includes a cruise guide indicator (CGI) system (i.e., the aforementioned system for determining whether rotor-induced oscillatory loads have become excessive or not) comprising a CGI controller 2, a cruise guide indicator 4 (part of a cockpit display) and a plurality of strain gauges 8. The strain gauges 8 are fixed to components in the control linkage mechanism under each rotor (one forward and one aft). The strain gauges 8 measure strains, and output signals representing the measured strains, to the CGI controller 2, which may be a signal processor unit. The CGI controller 2 synthesizes the strain gauge signals and sends out a single reading (based upon a prescribed ratio of forward and aft strain gauge readings) to the cruise guide indicator 4 for display. In one implementation, the cruise guide indicator 4 comprises three bands colored green, yellow, and red and a rotating virtual needle. The azimuth angle (hereinafter "CGI azimuth angle") of the virtual needle indicates the oscillatory load level. The CGI controller 2 is configured to calculate the CGI azimuth angle based on the strain gauge readings. Thus the CGI system gives the pilot a visual indication of actual loads imposed on critical components of the helicopter dynamic system. The cruise guide indicator 4 can provide a visual warning to the pilot to either decrease airspeed or reduce the severity of maneuvers to minimize loads in excess of the endurance limit of the aft dynamic components. In particular, immediate corrective action must be taken to reduce stress when the needle on the cruise guide indicator 4 is in the red band. However, this visual warning may be ineffective if the pilot and co-pilot are distracted or busy performing other tasks.

Still referring to FIG. 2, the active vibration control system 10 comprises a control panel 22, a system controller 24, a pilot force generator 26 vibrationally coupled to the cockpit structure in a vicinity of the pilot seat (not shown in FIG. 2), a co-pilot force generator 28 vibrationally coupled to the cockpit structure in a vicinity of the co-pilot seat (not shown), a pilot accelerometer 30 coupled to the cockpit structure in the vicinity of the pilot seat, and a co-pilot accelerometer 32 coupled to the cockpit structure in the vicinity of the co-pilot seat. For example, an active vibration control system of this type is commercially available from LORD Corporation, Cary, N.C.

The control panel 22 comprises power electronics switches and indicator lights and does not include a processor. The control panel 22 is able to accept 115-V alternating current (hereinafter "115 VAC") aircraft power (400 Hz) and 28-V direct current (hereinafter "28 VDC") aircraft power (indicated by "A/C" in FIG. 2). The control panel 22 receives 115 VAC aircraft power (indicated by "115 VAC (A/C)" in FIG. 2) that is synchronized with the main rotor speed (hereinafter "rotor rpm"). The 115 VAC aircraft power is generated by a main generator 36, which has rotor windings that rotate in synchronism with the rotors. The control panel 22 comprises switches which are configured to provide the 115 VAC aircraft power (indicated by "115 VAC (System)" in FIG. 2) for the pilot force generator 26 and co-pilot force generator 28 to operate. The control panel 22 also provides the 115 VAC aircraft power (indicated by "115 VAC (Tach)" in FIG. 2) to the system controller 24. The control panel 22 also receives 28 VDC aircraft power from an AC-to-DC converter 34 which is configured to convert 115 VAC aircraft power from the main generator 36 into 28 VDC aircraft power. The control panel also provides the 28 VDC aircraft power (indicated by "28 VDC (System)" in FIG. 2) to the system controller 24. The AC-to-DC converter 34 may comprise a transformer and a rectifier.

The system controller 24 comprises a processor that is configured to determine the rotor rpm $N_r$, based on the frequency of the power input 115 VAC (Tach). The system controller operates off the 28 VDC power and only uses the 115 VAC power to determine the rotor rpm $N_r$. The line labeled "Comm. Link & I/O" seen in FIG. 2 is only used if a diagnostic computer is hooked up to the control panel 22. The diagnostic computer can query the system controller 24 for various information to aid maintenance. This line is not used during normal operation of the active vibration control system 10. The system controller 24 also receives a safety interlock signal from the engine control lever (ECL) 40.

The pilot force generator 26 and co-pilot force generator 28 are respectively located in the vicinity of a component that the pilot or co-pilot come in contact with during piloting of the helicopter. For example, that component may comprise a seat or a stick. For the purpose of illustration, an example in which the pilot force generator 26 is coupled to cockpit structure located under a pilot seat (not shown in FIG. 2) and the co-pilot force generator 28 is coupled to cockpit structure located under a co-pilot seat (not shown in FIG. 2) will now be described. (As used herein, the cockpit structure is a component of the airframe.) In this example, the pilot force generator 26 can produce forces that generate counter-vibrations which at least partially counteract rotor-induced vibrations in the cockpit structure beneath the pilot seat, while the co-pilot force generator 28 can produce forces that generate counter-vibrations which at least partially counteract rotor-induced vibrations in the cockpit structure beneath the co-pilot seat. In addition, the pilot accelerometer 30 is coupled to the cockpit structure beneath the pilot seat, while the co-pilot accelerometer 32 is coupled to the cockpit structure beneath the co-pilot seat for measuring the respective vibration levels in those areas. The pilot accelerometer 30 and co-pilot accelerometer 32 output signals representing the measured accelerations (caused by the rotor-induced vibrations in the cockpit structure beneath the pilot seat or co-pilot seat, respectively) to the system controller 24.

The system controller 24 is further configured to control the operation of the force generators to minimize the vibration levels measured by the accelerometers. The output of the force generators is a function of the frequency and amplitude of the vibrations measured by the accelerometers at a given rotor rpm. If the vibration control system 10 is given a rotor rpm different than the actual rpm, then the force generators will put out forces that do not correspond to the current conditions, and the vibrations felt by the pilot and co-pilot will increase. More specifically, the system controller 24 is configured to execute algorithms that control steady-state and transient vibrations. The system controller 24 runs a software algorithm that interprets the signals from the pilot and co-pilot accelerometers 30, 32 and sends commands to pilot and co-pilot force generators 26, 28. These force generators create counter-vibrations that suppress the vibrations in the cockpit structure due to the rotors. The force generators may be configured to create either linear or circular control forces. In the case of circular force generators, high mass acceleration levels can be achieved by rotating two counter-rotating eccentric masses eccentrically at a desired vibrational frequency to produce two rotating force vectors that can be summed to produce a linearly oscillating force. The orthogonal components of these vectors add along a line of action and cancel at right angles to it.

In accordance with one embodiment, the pilot and co-pilot accelerometers 30, 32 are used as error sensors in a control loop. The system controller 24 works in principle like an adaptive bandpass filter with high gain at the center frequency. The inputs to the system controller 24 are the reference signal (i.e., rotor rpm) and the error signals from the accelerometers. The outputs of the system controller 24 are the commands sent to the pilot and co-pilot force generators 26, 28 via a controller area network (CAN) communications bus seen in FIG. 2. These commands are adjusted in accordance with a control strategy that seeks to minimize the vibrations measured by the pilot and co-pilot accelerometers 30, 32.

In accordance with one embodiment of the system proposed herein, the active vibration control system 10 is adapted to provide a pilot cueing aid in the form of pilot-perceptible vibrations having an amplitude which is indicative of an excessive rotor-induced vibration level. When the oscillatory loads become excessive, the active vibration control system 10 is temporarily detuned so that either the level of vibration suppression is reduced or vibration suppression is turned off (i.e., the system switches from an active state to a standby state) to cue the pilot to take action (e.g., to fly within operating limits). In accordance with the implementation proposed herein, the system detunes the active vibration control system 10 based upon a reading of the cruise guide indicator 4.

To achieve the above-described reformulation of the active vibration control system 10, the flight control computer 6 is configured to receive the signal representing the CGI azimuth angle from the CGI controller 2 and then control the operation of a signal conditioner 38 in dependence on whether the CGI azimuth angle exceeds a specified threshold indicative of excessive oscillatory loads or not. Preferably the signal conditioner 38 is configured to receive the 400-Hz 115 VAC aircraft power from the main generator 36 and output 115 VAC aircraft power having a frequency different than 400 Hz to the control panel 22. For this purpose, the signal conditioner 38 may be configured to perform the function of a frequency changer or frequency converter, which is an electronic or electromechanical device that converts alternating current of one frequency to alternating current of another frequency. In accordance with one embodiment, the signal conditioner 38 may comprise solid-state electronic circuitry comprising a rectifier stage (producing direct current) which is then inverted to produce alternating current of the desired frequency. The inverter may use integrated gate-commutated thyristors or insulated-gate bipolar transistors.

The flight control computer 6 (FCC) is configured to output a frequency change mode control signal (hereinafter "pilot cueing command") to the signal conditioner 38 which causes the latter to change the frequency of the 115 VAC aircraft power when the measured rotor-induced oscillatory load is excessive (i.e., when the CGI needle overlies the red band of the cruise guide indicator 4). In the absence of a pilot cueing command, the signal conditioner 38 will pass the 115 VAC aircraft power through to the control panel 22 unchanged. As explained in some detail in the following paragraph, the change in frequency must be large enough (e.g., as much as 40 Hz) to cause the active vibration control system 10 to change from an active mode (in which counter-vibrations are generated) to a standby mode (in which counter-vibrations are not generated).

FIG. 3 is a chart listing rotor rpms and input frequencies for various operational states of the active vibration control system 10 in accordance with one embodiment. The active vibration control system 10 has three states: (1) an active state in which the active vibration control system 10 attempts to minimize vibrations based on the input frequency of the 115 VAC (Tach) signal received from the control panel 22 (which signal has the same frequency as the 115 VAC (A/C) signal received by the control panel 22 from the signal conditioner 38); (2) a standby state in which the active vibration control system 10 has no force output, but can activate in response to the input frequency reaching the operating range (i.e., 96% to 106%); and (3) a passive or off state in which the active vibration control system 10 is not operating (i.e., the input frequency is either less than 90% or greater than 110%). The three states are controlled by the input frequency, which (as previously described) comes directly from the aircraft AC power bus (115 V, 400 Hz nominal when the rotors are spinning at 225 rpm or 100% operation). if the input frequency drops below about 96% (about 383 Hz), the active vibration control system 10 goes into standby mode. If the input frequency drops below 90% (about 360 Hz), then the active vibration control system 10 goes into passive mode. FIG. 3 lists a similar schedule for input frequencies higher than 100%.

In accordance with one proposed implementation, the active vibration control system 10 will change from the active mode to the standby mode when the input frequency either decreases from above 96% to below 96% or increases from below 106% to above 106%. (Other thresholds may be used depending on the respective modes of the particular vibration control system.) The signal conditioner 38 may be configured to produce either one of these mode changes in response to a pilot cueing command from the flight control computer 6, which is in turn configured to issue such pilot cueing command when the CGI azimuth angle exceeds a specified threshold indicative of excessive rotor-induced oscillatory loads.

In accordance with another proposed implementation, if a load (aircraft maneuver) exceedance is sensed by the flight control computer 6, the flight control computer 6 would initially just alter the input frequency to the active vibration control system 10 to differ from the frequency output by the main generator 36 by 10-15 Hz, in which case the pilot would begin to feel the inherent aircraft 3/rev vibration, but if the pilot did not take action, or the exceedance were severe, the flight control computer 6 would cue the signal conditioner 38 to put the active vibration control system 10 into standby mode by dropping the input frequency to 90%-95%, so that the 3/rev aircraft vibration would pass right through unsuppressed to the pilot.

Figure 4:
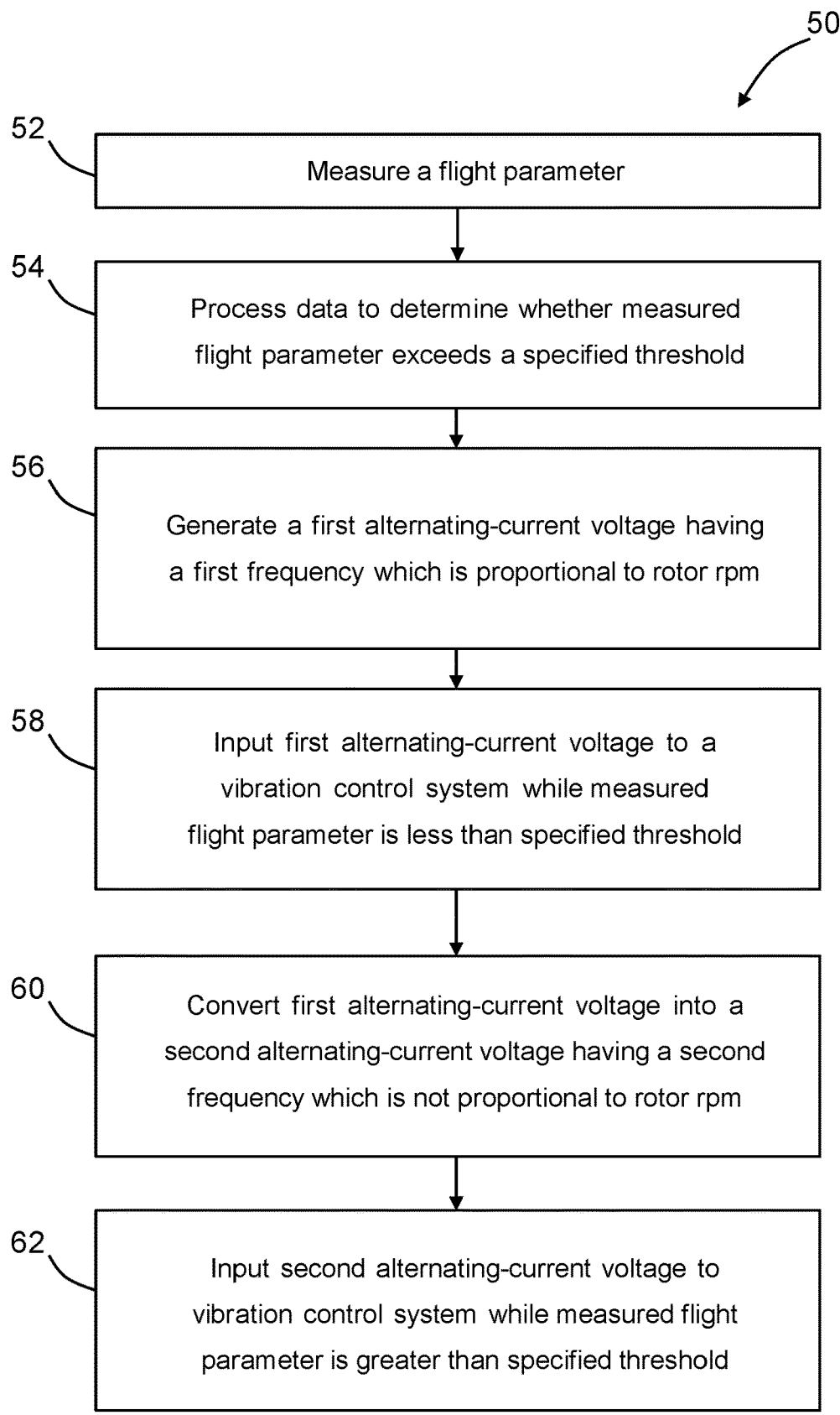
FIG. 4 is a flowchart identifying steps of a method for cueing a pilot when a measured flight parameter exceeds an operational constraint in accordance with one embodiment.

FIG. 4 is a flowchart identifying steps of a method 50 for cueing a pilot when a measured flight parameter exceeds an operational constraint in accordance with one embodiment. In accordance with method 50, a flight parameter is measured during flight of the rotorcraft (step 52). The resulting data representing the measured flight parameter is processed to determine whether the measured flight parameter exceeds a specified threshold (step 54). A first alternating-current voltage having a first frequency which is proportional to a rotor rpm is generated (step 56). The first alternating-current voltage in input to a vibration control system while the measured flight parameter is less than the specified threshold (step 58). The first alternating-current voltage is converted into a second alternating-current voltage having a second frequency which is not proportional to the rotor rpm when the measured flight parameter becomes greater than the specified threshold (step 60). The second alternating-current voltage, instead of the first alternating-current voltage, is input to the vibration control system while the measured flight parameter is greater than the specified threshold (step 62). The vibration control system is situated and configured to generate forces that suppress vibrations in the airframe of the rotorcraft having the first frequency in response to inputting of the first alternating-current voltage and to not generate forces in response to inputting of the second alternating-current voltage.

In accordance with alternative embodiments, the method for cueing a pilot when a measured flight parameter is excessive during flight of a rotorcraft, comprises: generating a power signal having a frequency which is a function of a rotor speed of a rotor system of the rotorcraft; measuring a flight parameter; processing data representing the measured flight parameter to determine whether the measured flight parameter exceeds a specified threshold; generating counter-vibrations in the airframe of the rotorcraft which have the frequency of the power signal while the measured flight parameter is less than the specified threshold; and ceasing the generation of counter-vibrations having the frequency of the power signal in response to the measured flight parameter exceeding the specified threshold.

While systems and methods for cueing a helicopter pilot when flight parameters become excessive have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The embodiments disclosed above may incorporate one or more computers or processors. As used in the claims, the term "computing system" means a system comprising one or more computers and/or one or more processors. Each computer may be a general-purpose computer programmed with application software comprising respective software modules capable of executing one or more of the functions described herein. Each processor may be a controller, a microcontroller, a microcomputer, a programmable logic controller, a central processing unit, a microprocessor, a digital signal processor, a field-programmable gate array, an application-specific integrated circuit, an arithmetic logic unit, or any other circuit or processing device capable of executing one or more of the functions described herein.

In instances where a computing system comprises two or more computers/processors, those components may communicate via a network or a bus. For example, the CGI controller 2 and the flight control computer 6 are respective computing systems that may communicate via a bus and which, considered in conjunction, form a larger computing system. The system controller 24 disclosed herein is also a computing system.

The methods described herein may be encoded as executable instructions embodied in a non-transitory tangible computer-readable storage medium, such as, without limitation, dynamic random access memory, static random access memory, a solid state disk, and/or a hard disk. Such instructions, when executed by a computing system, cause the system device to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The terms "first processor" and "second processor" appear in the appended claims. The corresponding structure disclosed herein which performs the function of the "first processor" is the CGI controller 2 and structural equivalents thereof. The corresponding structure disclosed herein which performs the function of the "second processor" is the flight control computer 6 and structural equivalents thereof.

The invention claimed is:

1. A method for cueing a pilot when a measured flight parameter is excessive during flight of an aircraft, comprising:
   generating a power signal having a frequency which is a function of a rotor speed of a rotor system of the aircraft;
   measuring a flight parameter;
   processing data representing the measured flight parameter to determine whether the measured flight parameter exceeds a specified threshold;
   suppressing vibration in a vicinity of a pilot seat by generating counter-vibrations which have the frequency of the power signal while the frequency of the power signal is in an active mode frequency range; and
   ceasing the generation of counter-vibrations in response to the measured flight parameter exceeding the specified threshold.

2. The method as recited in claim 1, wherein the flight parameter is derived from results of measurement of rotor-induced oscillatory loads.

3. The method as recited in claim 1, wherein the counter-vibrations are generated by a vibration control system in an active state, and ceasing the generation of counter-vibrations comprises changing the state of the vibration control system from the active state to a standby state.

4. The method as recited in claim 3, wherein generating the power signal comprises generating a first alternating-current voltage having a first frequency which is proportional to the rotor rpm, the method further comprising:
   inputting the first alternating-current voltage to the vibration control system while the measured flight parameter is less than the specified threshold; and
   not inputting the first alternating-current voltage to the vibration control system while the measured flight parameter is greater than the specified threshold.

5. The method as recited in claim 4, further comprising:
   converting the first alternating-current voltage into a second alternating-current voltage having a second frequency which is not proportional to the rotor rpm; and
   inputting the second alternating-current voltage to the vibration control system while the measured flight parameter is greater than the specified threshold.

6. The method as recited in claim 5, wherein the state of the vibration control system changes from the active state to the standby state in response to inputting of the second alternating-current voltage.

7. A method for cueing a pilot when a measured flight parameter is excessive during flight of an aircraft having a rotor system and a vibration control system configured to produce counter-vibrations based on an input frequency of a power signal, the method comprising:
- (a) measuring a flight parameter;
- (b) processing data representing the measured flight parameter to determine whether the measured flight parameter exceeds a specified threshold;
- (c) inputting to the vibration control system a power signal having a first frequency representative of a rotor speed of the rotor system in response to the measured flight parameter not exceeding the specified threshold;
- (d) controlling the vibration control system to provide an amount of vibration suppression in a vicinity of a pilot seat by generating counter-vibrations which have the first frequency;
- (e) inputting to the vibration control system a power signal having a second frequency less than the first frequency in response to the measured flight parameter exceeding the specified threshold; and
- (f) controlling the vibration control system to reduce the amount of vibration suppression in the vicinity of the pilot seat in response to inputting the power signal having the second frequency.

8. The method as recited in claim 7, wherein step (f) comprises generating counter-vibrations in the vicinity of the pilot seat which have the second frequency.

9. The method as recited in claim 7, wherein step (f) comprises ceasing generation of counter-vibrations in the vicinity of the pilot seat.

10. The method as recited in claim 7, wherein the flight parameter is derived from results of measurement of rotor-induced oscillatory loads.

11. The method as recited in claim 7, wherein the power signal is an alternating-current voltage, the method further comprising converting alternating current of the first frequency to alternating current of the second frequency subsequent to step (c) and prior to step (e).

12. An aircraft comprising:
an airframe;
a pilot seat attached to the airframe;
a rotor system comprising at least one rotor;
at least one strain gauge situated and configured to measure oscillatory loads transmitted from the rotor system to the airframe and output signals representing the measured oscillatory loads;
a generator configured to output a power signal having a first frequency which is a function of a rotor rpm of the rotor system;
a signal conditioner configured to output a power signal having a second frequency different than the first frequency in response to receipt of a command signal and further configured to output the power signal having the first frequency in response to non-receipt of the command signal, wherein the second frequency is not a function of the rotor rpm of the rotor system;
a vibration control system situated and configured to generate forces that suppress vibrations in a vicinity of the pilot seat in response to inputting of the power signal having the first frequency and to reduce the amount of vibration suppression in the vicinity of the pilot seat in response to inputting the power signal having the second frequency; and
a computing system configured to receive the signals representing the measured oscillatory loads and output the command signal in response to receipt of signals indicative of measured oscillatory loads in excess of a specified threshold.

13. The aircraft as recited in claim 12, wherein the state of the vibration control system changes from the active state to the standby state in response to output of a power signal having the second frequency by the signal conditioner.

14. The aircraft as recited in claim 12, wherein the computing system comprises a cruise guide indicator controller that is configured to output an azimuth angle signal and a flight control computer that outputs the command signal in response to receipt of an azimuth angle signal from the cruise guide indicator indicative of measured oscillatory loads in excess of a specified threshold.

15. The aircraft as recited in claim 12, wherein the vibration control system comprises a force generator mechanically coupled to the pilot seat.

16. The aircraft as recited in claim 12, wherein the vibration control system comprises a force generator mechanically coupled to a stick.

17. A pilot cueing system comprising:
one or more sensors configured to measure a flight parameter during flight of an aircraft and output signals representing the measured flight parameter;
a generator configured to output a power signal having a frequency which is a function of a rotor speed of a rotor system of the aircraft;
a signal conditioner configured to output a power signal having a second frequency different than the first frequency in response to receipt of a command signal and further configured to output the power signal having the first frequency in response to non-receipt of the command signal, wherein the second frequency is not a function of the rotor rpm of the rotor system;
a vibration control system situated and configured to generate forces that suppress vibrations in a vicinity of a pilot seat in response to inputting of the power signal having the first frequency and to reduce the amount of vibration suppression in the vicinity of the pilot seat in response to inputting the power signal having the second frequency; and
a computing system configured to output the command signal in response to receipt of signals indicative of a measured flight parameter in excess of a specified threshold.

18. The pilot cueing system as recited in claim 17, further comprising an indicator, wherein the computing system comprises:
a first processor or computer that outputs a signal to the indicator representing a current value of the measured flight parameter in response to receipt of the signals representing the measured flight parameter from the one or more sensors; and
a second processor or computer that outputs the command signal in response to the current value of the measured flight parameter being in excess of a specified threshold.

19. The pilot cueing system as recited in claim 16, wherein the one or more sensors are strain gauges and the measured flight parameter is derived from the results of measurement of rotor-induced oscillatory loads.

20. The pilot cueing system as recited in claim 19, wherein the computing system comprises a cruise guide indicator controller that is configured to output an azimuth angle signal and a flight control computer that outputs the command signal in response to receipt of an azimuth angle signal from the cruise guide indicator indicative of measured oscillatory loads in excess of a specified threshold.

* * * * *